US006959663B2

(12) United States Patent
Hjaltason et al.

(10) Patent No.: US 6,959,663 B2
(45) Date of Patent: Nov. 1, 2005

(54) REARING OF AQUATIC SPECIES WITH DHA-RICH PREY ORGANISMS

(76) Inventors: Baldur Hjaltason, Haaleitisbraut 93, 108 Reykjavik (IS); Gudmundur G. Haraldsson, Klyfjaseli 14, 109 Reykjavik (IS); Olafur Halldorsson, Hjallalundi 12, 600 Akureyri (IS)

( * ) Notice: Subject to any disclaimer, the term of this patent is extended or adjusted under 35 U.S.C. 154(b) by 353 days.

(21) Appl. No.: 10/181,227
(22) PCT Filed: Jan. 15, 2001
(86) PCT No.: PCT/IS01/00003

§ 371 (c)(1),
(2), (4) Date: Jul. 15, 2002

(87) PCT Pub. No.: WO01/50883

PCT Pub. Date: Jul. 19, 2001

(65) Prior Publication Data

US 2003/0017231 A1 Jan. 23, 2003

(30) Foreign Application Priority Data

Jan. 14, 2000 (IS) .................................................. 5346

(51) Int. Cl.[7] ........................ A01K 61/00; A01K 61/02; A23K 1/165
(52) U.S. Cl. ..................... 119/51.04; 119/204; 119/215; 119/230; 424/442; 800/8; 800/20
(58) Field of Search ............................. 119/51.04, 215, 119/230, 204; 424/442; 800/8, 20; 435/325

(56) References Cited

U.S. PATENT DOCUMENTS

| 4,593,647 A | 6/1986 | Sorgeloos et al. ............. 119/2 |
| 4,906,479 A | 3/1990 | Kitagawa et al. .............. 426/1 |
| 5,132,120 A | 7/1992 | Salte et al. ...................... 426/2 |
| 5,492,938 A | 2/1996 | Kyle et al. ................... 514/786 |
| 5,656,319 A | 8/1997 | Barclay ....................... 426/574 |
| 5,698,246 A | 12/1997 | Villamar ...................... 426/54 |
| 5,711,983 A | 1/1998 | Kyle et al. .................. 426/635 |
| 5,746,155 A | 5/1998 | Logan et al. ............... 119/230 |
| 6,372,460 B1 | 4/2002 | Gladue et al. .............. 435/134 |
| 6,399,118 B1 | 6/2002 | Zemach et al. ................ 426/2 |
| 6,582,941 B1 | 6/2003 | Yokochi et al. ............. 435/134 |
| 6,789,502 B2 * | 9/2004 | Hjaltason et al. ........ 119/51.04 |

FOREIGN PATENT DOCUMENTS

| WO | 96/17526 | 6/1996 |
| WO | 99/06585 | 2/1999 |
| WO | 99/37166 | 7/1999 |

OTHER PUBLICATIONS

L.A. McEnvoy et al, "Two novel Artemia enrichment diets containing polar lipid", Aquaculture 144 (1996) pp. 339–352.*

L. A. McEvoy et al., "Lipid and fatty acid composition of normal and malpigmented Atlantic halibut (*Hippoglossus hippoglossus*) fed enriched Artemia: a comparison with fry fed wild copepods," Aquaculture 163 (1998), (pp. 237–250).

J. C. Navarro et al., "Effects of two Artemia diets with different contents of polyunsaturated fatty acids on the lipid composition of larvae of Atlantic herring (*Clupea harengus*)," Journal of Fish Biology (1993) 43, pp. 503–515.

John Sargent et al., "Lipid nutrition of marine fish during early development: current status and future directions," Aquaculture 179 (1999), pp. 217–229.

Douglas R. Tocher et al., "The use of silages prepared from fish neural tissues as enrichers for rotifers (*Brachionus plicatilis*) and Artemia in the nutrition of larval marine fish," Aquaculture 148 (1997), Aquatic Sci & Fish Abs., accession No. 00576751, pp. 213–231 1 page abstract.

Database WPI, Section Ch. Week 199404, Derwent Publications Ltd., London, GB; AN 1994–010938, XP002901677 & JP 05 316958 A (Riken Vitamin Co.), Dec. 3, 1993, abstract.

Patent Abstract of Japan vol. 018, No. 131 (C–1175), Mar. 3, 1994 & JP 05 316958 (Riken Vitamin Co. Ltd.), Dec. 3, 1993, English abstract.

Patent Abstract of Japan, vol. 1996, No. 08, Aug. 30, 1996 & JP 098659 A (Nippon Suisan Kaisha Ltd.), Apr. 16, 1996, English abstract.

Patent Abstracts of Japan, vol. 1997, No. 09, Sep. 30, 1997 & JP 09 121784 (Nippon Suisan Kaisha Ltd.), May 13, 1997, abstract.

U.S. Appl. No. 10/181,226, filed Jul. 15, 2002, Hjaltason et al.

Patent Abstracts of Japan, vol. 016, No. 093 (C–0917), Mar. 6, 1992 & JP 03 277241 (Higashimaru: KK), Dec. 9, 1991, abstract.

Patent Abstract of Japan, vol. 016, No. 093 (C–0917), Mar. 6, 1992 & JP 03 277242 (Higashimaru: KK), Dec. 9 abstract.

(Continued)

*Primary Examiner*—David M. Naff
*Assistant Examiner*—Deborah K. Ware
(74) *Attorney, Agent, or Firm*—Hunton & Williams

(57) ABSTRACT

A method of rearing aquatic species is provided, comprising feeding the aquatic species during at least part of the larval and/or post-larval state with prey organisms, such as *Artemia* or rotifers, having in their total lipid content a DHA content of at least 12 wt %. The method is suitable for the rearing of fish species such as halibut, turbot, bass, bream and flounder. The total lipid content of the prey organisms further including highly unsaturated fatty acids comprising 18:3, 18:4, 20:4, 20:5 (EPA) and 22:5 fatty acids. Also the prey organisms include 5 to 35 wt % phospholipids of the total lipid content, wherein the total lipid content is at least 20 wt % on a dry weight basis.

29 Claims, No Drawings

OTHER PUBLICATIONS

G. Mourente et al., "The effects of weaning onto a dry pellet diet on brain lipid and fatty acid compositions in post–larval gilthead sea bream (*Sparus aurata* L.)," Aquatic Sci. & Fish Abs., pp. 605–611 (1993) accession No. 00436265, 1 page abstract.

J. W. Tucker, "Feeding intensively–reared marine fish larvae," Aquatic Sci. & Fish Abs., pp. 129–146 (1992), accession No. 00507558, 1 page.

L.A. McEvoy et al., "Two novel Artemia enrichment diets containing polar lipid" Aquaculture, 144 (1996) pp. 339–352.

Communication Pursuant to Article 115(2) EPC (EPO Form 2022) 0.197 from European Patent Office dated Apr. 19, 2005.

Acknowledgement of Receipt of Observations by Third Parties (Article 115 EPC) (EPO Form 2026) 08.98 from European Patent Office dated Apr. 19, 2005.

Letter from Rebecca Gardner of Frank B. Dehn & Co., dated Apr. 11, 2005 (Fax and Confirmation of Fax).

* cited by examiner

REARING OF AQUATIC SPECIES WITH DHA-RICH PREY ORGANISMS

FIELD OF THE INVENTION

The present invention is within the field of aquaculture, in particular there is provided a method for aquacultural rearing of aquatic species on prey organisms enriched in highly unsaturated fatty acids (HUFAs), in particular docosahexaenoic acid (DHA), providing high survival rates during the fish larval stage.

TECHNICAL BACKGROUND AND PRIOR ART

The consumption of seafood species for which there is a high consumer demand such as salmon, trout, halibut and eel is increasing and due to this high demand and limited natural stocks, much effort is spent on developing cost effective aquacultural methods of farming such species. A particularly serious problem is to secure a high survival rate of the hatched larvae of the species being cultivated.

Expansion of the aquaculture industry requires that several problems be addressed, one of the most significant being the difficulty of supplying live prey organisms which provide a nutritionally adequate feed for the larvae. Larval fish in the wild consume a mixed population of phytoplankton prey organisms that provide a balanced nutrition. However, collecting phytoplankton in sufficient quantities to meet the demand in aquaculture is not feasible. As an alternative, selected species of prey organisms, in particular rotifers and *Artemia* species, are presently cultivated and used as feed.

Generally however, such artificially cultivated prey organisms, although they provide adequate amounts of protein and energy, have a lipid composition which is not adequate to cover the requirement for certain HUFAs, in particular DHA and EPA (eicosapentaenoic acid) which are essential for the optimum survival, growth and development of larvae. Specifically, it has been shown that a high content of DHA is required and that the ratio between DHA and EPA In the prey organisms should be at least 1:1 and preferably at least 2:1.

Currently, this problem is being addressed by cultivating the prey organisms in the presence of enrichment compositions permitting the organisms to be enriched in respect of these essential fatty acids. However, presently available commercial compositions for that purpose such as products sold under the tradename Selco (TM) do not meet the above requirements in that the DHA content is relatively low and/or the DHA: EPA ratio is not high enough. Using such compositions *Artemia* enrichment levels of 3–5% DHA of total lipids have been reported (McEvoy et al. Aquaculture 163 (1998) 237–250), and 12 to 15% survival rates of fish fed such *Artemia* (McEvoy et al. supra; Navarro et al. J. Fish Biol. 43 (1993) 503–515). ). In this context, survival rates are defined as survival percentage from first feeding through metamorphosis. For cost-effective aquaculture production a larval survival rate of 50% and preferably higher should be obtained.

WO 99/37166 discloses a method for the enrichment of live prey organisms with nutrients essential for fish larvae based on the use of dry soap powders of HUFAs obtained from the waste stream of marine algae oil extraction. *Artemia* DHA enrichment levels of about 2.7% of dry weight are disclosed, but the use in aquaculture and efficacy with respect to fish larvae survival is not disclosed.

Another material intended for use in aquaculture is described in WO 99/06585. Examples disclose a DHA content of 24 wt %, but the phospholipid content is not disclosed. The material however, contains a high proportion of free fatty acids (about 32–37 wt %) and a high content of non-lipid material which may reduce the lipid uptake efficiency of prey animals. A high content of free fatty acids is generally considered harmful for fish juveniles.

Neither of the two last-mentioned materials is fish-based and they lack many HUFAs found in fish, such as EPA and other n-3 fatty acids, desirable for fish juveniles.

In a recent review by Sargent et al. (Aquaculture 179 (1999) 217–229) it is emphasized that in addition to the requirement in respect of HUFAs, fish larvae have a dietary requirement for phospholipids and it is stressed that the ideal diet for fish larvae is a diet having a composition similar to the yolk of the eggs. According to these authors fish egg yolk contains about 10 wt % (on a dry matter basis) phospholipids which contain about 17 wt % of DHA and about 9 wt % of EPA. These authors conclude in their review that a problem remains with respect to how to construct such a diet on a commercial scale from currently available materials.

It has now been found that it is possible to provide enriched aquacultural prey organisms having, in respect of HUFAs and phospholipids, a composition which is very close to that of fish egg yolk. By using the prey organisms of the invention it is possible to secure optimum survival, growth, pigmentation and morphogenesis of aquatic organism larvae such as halibut larvae. As demonstrated herein, the invention provides much higher survival rates during the larval stage and increased quality parameters than previously disclosed for fish such as Halibut, thus making aquacultural rearing of many high-demand fish species more economical and commercially viable.

SUMMARY OF INVENTION

The invention provides a method of rearing an aquatic species, the method comprising feeding the aquatic species during at least part of the larval and/or post-larval stage with prey organisms having in their total lipid content a content of DHA of at least 12 wt %.

DETAILED DESCRIPTION OF THE INVENTION

The method according to the invention, of rearing an aquatic species, comprises feeding the aquatic species during at least part of the larval and/or post-larval stage with prey organisms having in their total lipid content a content of DHA of at least 12 wt %, preferably at least 15 wt %, such as at least 17 wt % more preferably at least 20 wt %, such as at least 25 wt %.

In preferred embodiments, the prey organisms also contain a significant amount of phospholipids, such as e.g. in the range of 5–35 wt % of the total lipid content, such as in the range of 5–25 wt % including in the range of 10–20 wt % of total lipid.

It is additionally preferred that the prey organisms provide other HUFAs which are desired for fish larvae and juveniles, such as EPA and other fish-characteristic n-3 HUFAs such as 18:3, 18:4, 20:4, and 22:5.

The inventors have found that such prey organisms for the method of the invention can be obtained by enrichment with DHA enriched lipid materials, preferably materials derived from fish-based sources.

The prey organisms should preferably not contain too high content of free fatty acids, as these are generally considered harmful in large amounts to fish larvae and juveniles. Preferably, free fatty acids are less than about 10 wt % of total lipid of the prey organisms according to the method of the invention.

In the present context, the expression 'prey organisms' refers to any marine organism which can be used as live feed for larvae of aquatic species which are produced in aquacultural facilities. A general review of such prey organisms can be found in Lavens & Sorgeloos (eds.) "Manual on the production and use of live food for aquaculture" published by FAO (1995) which is hereby incorporated by reference. Accordingly, the most commonly used prey organisms include several classes and genera of microalgae, rotifers, *Artemia*, zooplankton including copepods, cladocerans, nematodes, and trochophora larvae.

As used herein, the term 'aquatic species' is to be understood in its broadest sense and comprises both limnobiotic and marine species, including fish species such as salmon, trout carp, bass, bream, turbot, sea bass, sole, milkfish, gray mullet, grouper, sea bream, halibut, flounder, Japanese flounder, and monkfish; crustaceans such as shrimp, lobster, crayfish and crabs; and molluses such as bivalves.

A common feature of these aquatic species is that the life cycle includes one or more larval stages which may have very specific nutritional requirements and accordingly the provision of live prey organisms meeting this requirement is an essential factor for successful aquacultural production. As mentioned above, one such specific requirement is a high content of the essential fatty acid DHA, the term 'essential' implying that the prey organisms are not capable of de novo synthesis of such compounds.

A particular embodiment of the invention involves the rearing of halibut species, however, the invention also encompasses other aquatic species as, for example, those mentioned above.

A primary benefit of the invention is that much higher survival rates for fish larvae can be achieved than have hitherto been reached by any other methods, for species like Halibut and many others, to the best of our knowledge. As demonstrated in the accompanying examples, consistent survival rates for Halibut during the larval stage of 65–80% and even higher, can be achieved in large scale fish farming according to the invention, and other quality parameters such as correct pigmentation are excellent In a useful embodiment of the invention, the prey organisms are fed to the aquatic species such as halibut, at a larval stage, preferably such that at least 30% of the larvae are alive at the end of the larval stage, more preferably such that at least 50% are alive at the end of the larval stage including at least 60%, even more preferably such that at least 70% are alive at the end of the larval stage, including that at least 80% are alive at the end of the larval stage.

Correct pigmentation of the grown cultivated species is an important feature with respect to market value. A normally pigmented halibut has a colored ocular side and a white, non-pigmented blind side. In a preferred embodiment of the invention, at least 70% of halibut juveniles (newly metamorphosed larvae) show correct pigmentation, more preferably at least 80%, even more preferably at least 90%, such as 95%, including that essentially all juveniles show correct pigmentation.

In certain embodiments, the invention provides a method of rearing aquatic species raised not primarily for consumption, such as ornamental fish species and aquarium fish species.

According to the method, the prey organisms for feeding the aquatic species may be selected from any prey organisms that can be raised and used in aquaculture, in useful embodiments the prey organisms are a crustacean species such as *Artemia, Copepoda, Daphnia*, or *Moina* species; a *Rotifera* species including *Brachionus plicatilis, Brachionus rotundiformis*, and *Brachionus rubens*; or a *Brachiopoda* species.

The embodiments involving *Artemia* species are particularly useful. The *Artemia* species can be cultivated and used according to the method of the invention at a naupliar, metanaupliar, or adult stage.

In certain embodiments of the invention, the aquatic organisms are reared in a marine environment. A marine environment is used herein to describe an aqueous medium comprising sea water or simulating sea water, such as an aqueous medium with added salt, e.g., sodium chloride.

According to the invention, the prey organisms may be fed to the aquatic organisms in any suitable form, e.g., as a composition comprising the prey organisms. In a preferred embodiment, the organisms of said composition have a content of DHA of at least 20 wt % of the total lipid content of the organisms, more preferably at least 25 wt % of the total lipid content of the organisms, such as at (east 30 wt % of the total lipid content of the organisms.

In an embodiment of the invention, the composition comprises aquatic fish feed organisms having a content of DHA of at least 12 wt % of the total lipid content of the organisms, said composition comprising an aqueous phase of at least 50 wt %. In a particular embodiment, the aqueous phase of the composition comprises at least 0,5 wt % of sodium chloride.

The composition is in other embodiments partially dry, such that is has a water content less-than 50 wt %, such as at the most 40 wt %, including at the most 25 wt %, such as at the most 10 wt %, including at the most 5 wt % of water. Such a composition may be in any suitable form, including a powder form, granules, and in the form of flakes.

As can be inferred from the above, in order for the composition to provide a significant DHA ration, the total lipid content of the prey organisms needs to be significant such as, e.g., at least 20 wt % on a dry matter basis, including at least 25% dw, and preferably at least 30% dw.

EXAMPLE 1

Preparation of an Enrichment Composition for Fish Larvae Prey Organisms

A composition for prey organisms such as *Artemia* species was prepared by combining and mixing the following ingredients:

TABLE 1.1

| | |
|---|---|
| phospholipid-rich component from squid mantles | 9.7 g |
| TG 4010 (TM), Croda, essentially triglycerides w/ ≈40 wt % DHA | 78.0 g |
| vitamin C (ascorbyl palmitate) | 8.5 g |
| co-emulsifer, BASF Chremophore A25 (TM) | 1.6 g |
| Glucan Macroguard (TM) (immunostimulant) | 0.8 g |
| vitamin A (vitamin A palmitate, 1 mill i.u./g) | 0.190 g |
| vitamin E (DL-alpha tocopherol acetate) | 0.155 g |
| vitamin B (thiamine hydrochloride) | 1.2 g |
| TBHQ (antioxidant) | 0.036 g |
| Ethoxyquin (antioxidant) | 0.038 g |
| Total | 100 g |

The phospholipid-rich component is prepared accordingly: Minced squid (150 kg) was added to 300 L of isopropanol and the mixture was agitated rather vigorously for 4–6 h and left to stand overnight. Subsequently, the mixture was filtered and 300 L of hexane were added to the filtrate and mixed. This resulted in two phases which were allowed to separate. The upper phase, which largely consisted of hexane and isopropanol was separated and subjected to distillation in several rounds in vacuum using a 50 L rotary evaporator to yield a total of 2.2 kg of a phospholipid enriched fraction as a brown-yellowish wax having a phospholipid content of about 65 wt % and a total DHA content of about 40 wt %.

The TG 4010 material used as a DHA-rich component in the composition is derived from fish oil-based material which is enriched for DHA, it comprises 40 wt % DHA, about 10 wt % EPA and about 10 wt % other n-3 HUFAs. The fatty acids are mostly in the form of triglycerides and the material has a very low free fatty acid content.

Other materials have been tested as sources of a DHA-rich component, such as TG 5010 (also from Croda) which has a DHA content of about 50 wt %, and enzymatically synthesized highly DHA-enriched triglycerides.

EXAMPLE 2

Cultivation of Enriched *Artemia* for Rearing of Aquatic Species

*Artemia* cysts were hatched under optimal conditions (in seawater, 27–29° C., pH about 8, oxygen content above 4 mg/L). The newly hatched naupliar *Artemia* were rinsed and put in 250 L tanks to give a density of 200.000/L. Temperature was kept at 25–28° C., oxygen content at 5–6 mg/L and pH buffered at 7.5 with sodium bicarbonate (2 g/L). The tanks were aerated by passing atmospheric air through perforated hoses at bottom of tanks. Enrichment composition as described in Example 1 was added to the tanks to a concentration of 0,2 g/L and the same amount added 10 h later. 24 h after the first addition of enrichment composition the *Artemia* has the following lipid composition (31 % dw (dry weight) lipids, numbers in left-most column refer to the number of carbons and double bond In the fatty acids of the lipid components, DHA is 22:6 and EPA 20:5):

|      | PL 16% | TG 76% | FFA 8% | Total 100% |
| --- | --- | --- | --- | --- |
| 14:0 | 8.8 | 1.0 | 3.1 | 0.8 |
| 16:0 | 15.0 | 8.8 | 36.0 | 11.1 |
| 16:1 | 2.6 | 3.2 | 3.1 | 2.5 |
| 18:0 | 6.4 | 2.7 | 6.3 | 4.2 |
| 18:1 | 25.2 | 15.6 | 13.0 | 17.1 |
| 18:2 | 4.2 | 3.5 | 1.8 | 3.3 |
| 18:3 | 13.2 | 19.2 | 6.5 | 14.7 |
| 18:4 | 2.2 | 3.1 | 1.7 | 2.4 |
| 20:1 | 1.6 | 1.0 | 0.0 | 0.9 |
| 20:4 | 2.8 | 2.1 | 0.0 | 2.2 |
| 20:5 | 12.5 | 10.2 | 4.4 | 9.5 |
| 22:1 | 0.0 | 0.0 | 0.0 | |
| 22:4 | 0.0 | 1.1 | 0.0 | 1.2 |
| 22:5 | 0.0 | 1.0 | 0.0 | 1.1 |
| 22:6 | 4.6 | 20.0 | 14.8 | 18.9 |
| | 99.0 | 92.5 | 90.7 | 90.0 |

The *Artemia* thus obtained has a highly enriched total concentration of DHA and is very suitable for feeding fish larvae such as halibut larvae according to the invention.

EXAMPLE 3

Cultivation of *Artemia* with Alternative Enrichment Composition

Newly hatched *Artemia* wer placed in 250 L tanks and same conditions as described in Example 2. The *Artemia* were fed a lipid composition mixed 2 wt % Chremophore A25 emulsifier. The lipid composition contained 50 wt % of the phospholipid component of the Example 1 composition; 25 wt % 'DHA-80', essentially triglycerides comprising 80 wt % DHA, synthesized enzymatically from glycerol and DHA fatty acid using lipase from Candida Antarctica (as described in U.S. Pat. No. 5,604,119); and 25 wt % Lysi-22 (TM) (Lysi hf, Iceland), a fish oil with 22 wt % DHA. The feed composition was added to the tanks to a concentration of 0,2 g/L and the same amount added 12 h later. 24 h after the first addition of enrichment composition the *Artemia* has the following lipid composition (34% dw lipids):

|      | PL 25% | TG 72% | FFA 3% | Total 100% |
| --- | --- | --- | --- | --- |
| 14:0 | 0.9 | 1.1 | 0.0 | 1.3 |
| 16:0 | 13.6 | 10.6 | 32.0 | 11.2 |
| 16:1 | 3.3 | 3.5 | 3.3 | 3.4 |
| 18:0 | 5.8 | 2.2 | 10.6 | 3.3 |
| 18:1 | 26.2 | 15.4 | 15.7 | 15.1 |
| 18:2 | 3.7 | 2.7 | 0.0 | 2.5 |
| 18:3 | 13.8 | 15.0 | 4.4 | 13.7 |
| 18:4 | 2.7 | 2.1 | 0.0 | 2.2 |
| 20:1 | 1.0 | 1.9 | 5.3 | 2.0 |
| 20:4 | 2.1 | 1.7 | 0.0 | 1.9 |
| 20:5 | 13.1 | 8.7 | 5.0 | 9.7 |
| 22:6 | 8.4 | 28.8 | 23.6 | 28.0 |
| | 94.6 | 93.7 | 100.0 | 94.1 |

The *Artemia* obtained has a very highly enriched total concentration of DHA (9,5% dw) in accordance with the invention as well as other fish-characteristic n-3 HUFAs, and is thus particularly suitable for feeding fish larvae such as halibut larvae.

EXAMPLE 4

Use of Enrichment Composition for Cultivating Rotifers (*Brachionus Plicatilis*)

Rotifers were reared under similar conditions as described in Example 2, they were fed with *Isochrysis* plankton and yeast and enriched for 6 h at 27 C with an enrichment composition as described in Example 2, except that Croda 50 was used instead of Croda 40, Croda 50 containing about 50 wt % of DHA. The rotifers had the following lipid composition (22% dw lipids):

|      | PL 32% | TG 56% | FFA 13% | Total 100% |
| --- | --- | --- | --- | --- |
| 14:0 | 6.6 | 7.8 | 3.3 | 6.9 |
| 16:0 | 25.9 | 4.9 | 15.2 | 13.0 |
| 16:1 | 1.9 | 2.5 | 1.3 | 2.2 |
| 18:0 | 3.6 | 5.7 | 2.7 | 4.7 |
| 18:1 | 4.5 | 4.5 | 5.5 | 4.7 |
| 18:2 | 4.9 | 0.3 | 2.0 | 2.0 |
| 18:3 | 3.1 | 3.2 | 1.9 | 3.0 |
| 18:4 | 2.2 | 6.2 | 2.2 | 4.4 |
| 20:1 | 1.2 | 1.9 | 1.5 | 1.6 |
| 20:4 | 5.0 | 2.3 | 2.2 | 3.2 |
| 20:5 | 10.1 | 14.7 | 14.8 | 13.4 |
| 22:6 | 25.6 | 38.8 | 40.4 | 35.2 |
| | 94.7 | 92.7 | 93.0 | 94.3 |

The rotifers obtained have a very high total concentration of DHA, and a very high phospholipid content and thus and thus are highly suitable for aquacultural rearing according to the invention.

EXAMPLE 5

Use of HUFA- and Phospholipid-enriched *Artemia* for Aquacultural Rearig of Halibut Halibut larvae were first fed at 230–250° d. ('° d' multiplication factor of temperature (° C.) and days since hatching.) Circular rearing tanks were used, either 3,5 or 7 m$^3$. Larvae were gradually acclimatized to a rearing temperature of 11° C. and a light intensity of 300–500 lux. The larvae were fed *Artemia* twice per day, in the morning and in the late afternoon. The *Artemia* was enriched with an enrichment composition 24 h before the morning feed, then stored at 13–15° C. for another 7–8 h for the afternoon feed. Feed rations were adjusted to allow for good digestion of the *Artemia*. Microalgae (*Isocrysis* sp.) wee added to the rearing water to reduce stress and facilitate maximum ingestion rates. Slight aeration was applied in the center of the tanks to homogenize the water quality and the feed particles. Slight circular current was acquired with the inflow to distribute the larvae. Water exchange was increased from 1,2 times per 24 h in the beginning up to 3,3 times per 24 h in the end. Larval rearing tanks were cleaned daily.

Survival rates of over 80% in one tank from start of feed to end of larval stage were observed (90% excluding "gapers": larvae with jaw deformity), and frequently survival rates between 65 and 75% have been observed. On average about 80% of juveniles showed correct pigmentation, but upto 96% correct pigmentation in one tank were observed. Correct pigmentation is defined as a normal pigmentation color on the ocular side and no pigmentation on the blind side. About 65% of juveniles on average but up to 80% in one tank showed correct eye migration, that is having both eyes on the ocular side. Ongoing experiments indicate that even higher average survival and pigmentation rates are obtainable.

The results show that DHA-enriched prey organisms according to the invention are particularly suitable for the rearing of aquatic species such as halibut in terms of high survival rates and quality.

We claim:

1. A method of rearing an aquatic species, the method comprising feeding the aquatic species during at least part of the larval and/or post-larval stage with prey organisms, the prey organisms having in their total lipid content a content of DHA of at least 12 wt %; providing n-3 HUFAs including 18:3, 18:4, 20:4, 20:5 (EPA) and 22:5 fatty acids, the organisms comprising in the range of 5–35 wt % phospholipids of the total lipid content, and having a total lipid content of at least 20 wt % on a dry weight basis.

2. A method according to claim 1 wherein the DHA content in the total lipid content is at least 20 wt %.

3. A method according to claim 1 wherein the prey organisms are cultivated and are selected from the group consisting of a crustacean species, *Rotifera* species and *Brachiopoda* species.

4. A method according to claim 3 wherein the crustacean species is an *Artemia* species.

5. A method according to claim 4 wherein the *Artemia* species is cultivated in the aqueous medium at a naupliar, metanaupliar, or adult stage.

6. A method according to claim 3 wherein the prey organisms are *Rotifera* species or a *Brachiopoda* species.

7. A method according to claim 6 wherein the *Rotifera* species includes *Brachionus plicatilis, Brachionus rotundiformis*, and/or *Brachionus rubens*.

8. A method according to claim 1 wherein the aquatic species being reared is of a halibut species.

9. A method according to claim 8 wherein the prey organisms are fed to the halibut species at its larval stage.

10. A method according to claim 9 wherein at least 30% of the larvae being fed are alive at the end of the larval stage.

11. A method according to claim 10 wherein at least 50% of the larvae being fed are alive at the end of the larval stage.

12. A method according to claim 11 wherein at least 70% of the larvae being fed are alive at the end of the larval stage.

13. A method according to claim 9 wherein after metamorphosis at least 70% of juveniles show correct pigmentation.

14. A method according to claim 1 wherein at least 90% of juveniles show correct pigmentation.

15. A method according to claim 1 wherein the aquatic species is reared in a marine environment.

16. A method according to claim 1 wherein the aquatic species is fed an the feed composition comprising aquatic prey organisms having a content of DHA of at least 20 wt % of the total lipid content of the prey organisms.

17. A method according to claim 16 wherein the aquatic species is fed a composition comprising the prey organisms having a content of DHA of at least 25 wt % of the total lipid content of the prey organisms.

18. A method according to claim 1 wherein the aquatic species is fed a composition comprising aquatic fish feed organisms comprising the prey organisms, the composition comprising an aqueous phase of at least 50 wt %.

19. A method according to claim 18 wherein the aqueous phase comprises at least 0.5 wt % of NaCl.

20. A method according to claim 1 wherein the aquatic species is fed a composition comprising aquatic feed animals comprising the prey organisms, the composition having a water content that is less than 50 wt %.

21. A method according to claim 20 wherein the composition is in a form selected from the group consisting of powder, granules and flakes.

22. A method according to claim 1 wherein the aquatic species being fed is selected from the group consisting of fish, crustaceans and molluses.

23. A method according to claim 1 wherein the aquatic species being fed is selected from the group consisting of an ornamental fish species and an aquarium fish species.

24. A method according to claim 1, wherein the DHA content in the total lipid content is at least 25 wt %.

25. A method according to claim 3, wherein the crustacean species include *Artemia, Copepoda, Daphnia*, and *Moina* species.

26. A method according to claim 9, wherein after metamorphoses at least 80% of juveniles show correct pigmentation.

27. A method according to claim 1, wherein after metamorphoses at least 95% of juveniles show correct pigmentation.

28. A method according to claim 1, wherein the prey organisms are In C. composition having a water content of not more than 10 wt %.

29. A method according to claim 22, wherein the fish includes salmon, trout, carp, bass, bream, turbot, sole, milkfish, grey muller, grouper, flounder, sea bass, cod, haddock, Japanese flounder and/or eel; the crustaceans include shrimp, lobster, crayfish and crabs; and the molluses include bivalves.

* * * * *

UNITED STATES PATENT AND TRADEMARK OFFICE
CERTIFICATE OF CORRECTION

PATENT NO. : 6,959,663 B2
DATED : November 1, 2005
INVENTOR(S) : Baldur Hjaltason, Gudmundur G. Haraldsson and Olafur Halldorsson It is certified that error appears in the above-identified patent and that said Letters Patent is hereby corrected as shown below:

Column 7,
Line 46, replace "12 wt%" with -- 15 wt% --.
Line 46, replace "providing" with -- the prey organism further comprising --.
Line 48, before "organism" insert -- prey --.

Signed and Sealed this

Twenty-eighth Day of February, 2006

JON W. DUDAS
*Director of the United States Patent and Trademark Office*